United States Patent
Liu et al.

(10) Patent No.: US 7,255,942 B2
(45) Date of Patent: Aug. 14, 2007

(54) USING PLATED SURFACE FOR RECORDING MEDIA WITHOUT POLISHING

(75) Inventors: Connie C. Liu, San Jose, CA (US); Linda L. Zhong, Fremont, CA (US); Ian J. Beresford, Anaheim, CA (US); Lin Huang, San Jose, CA (US); Joseph Leigh, Campbell, CA (US); David E. Brown, San Jose, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/775,712

(22) Filed: Feb. 9, 2004

(65) Prior Publication Data

US 2004/0161635 A1    Aug. 19, 2004

Related U.S. Application Data

(62) Division of application No. 09/895,053, filed on Jun. 29, 2001, now Pat. No. 6,689,413.

(60) Provisional application No. 60/232,897, filed on Sep. 15, 2000.

(51) Int. Cl.
    *G11B 5/66* (2006.01)

(52) U.S. Cl. .................................................. 428/831.1
(58) Field of Classification Search .......... 428/694 TS, 428/65.3, 900, 336, 831.1
    See application file for complete search history.

(56) References Cited

U.S. PATENT DOCUMENTS

| | | | | |
|---|---|---|---|---|
| 5,153,044 A * | 10/1992 | Chen et al. | ............... | 428/832.1 |
| 5,405,646 A * | 4/1995 | Nanis | ............... | 427/131 |
| 5,747,135 A * | 5/1998 | Chakrabarti et al. | ...... | 428/846.2 |
| 5,840,394 A * | 11/1998 | Ranjan et al. | ............. | 428/65.3 |
| 5,980,997 A * | 11/1999 | Ross et al. | ................... | 427/555 |
| 6,699,601 B1 * | 3/2004 | Sato et al. | ............. | 428/694 TS |
| 6,986,956 B2 * | 1/2006 | Nanis | ...................... | 428/846.2 |

* cited by examiner

Primary Examiner—Holly Rickman
(74) Attorney, Agent, or Firm—Darby & Darby

(57) ABSTRACT

Ultra smooth as-deposited composite nickel coatings for use in an information storage system are provided. The composite nickel coatings include an electrolessly deposited nickel layer formed on a sputter deposited nickel layer. The composite nickel coatings have an as-deposited surface roughness of less than about 10 Å. Embodiments include formation of the composite nickel coating on a disk, followed by deposition of an underlayer and magnetic layer thereon to form a magnetic recording medium.

7 Claims, 3 Drawing Sheets

USING PLATED SURFACE FOR RECORDING MEDIA WITHOUT POLISHING

CROSS REFERENCE TO A RELATED APPLICATION

This application claims priority benefit of U.S. Provisional Patent Application Ser. No. 60/232,897 filed Sep. 15, 2000, entitled USING PLATED SURFACE FOR RECORDING MEDIA WITHOUT POLISHING in the name of Connie C. Liu, Linda L. Zhong, Ian J. Beresford, Lin Huang, Joseph Leigh and David E. Brown, which is herein incorporated by reference in its entirety.

This is a divisional of application Ser. No. 09/895,053 filed on Jun. 29, 2001 now U.S. Pat. No. 6,689,413.

BACKGROUND OF THE DISCLOSURE

1. Field of the Invention

The present invention relates to nickel-coated substrates. The invention has particular applicability to the manufacture of magnetic recording media.

2. Description of the Background Art

Nickel (Ni) plating, particularly electroless Ni platings or deposits, enjoys technological applicability in various industries, such as the electronic, oil and gas, aerospace, machinery, automobile and magnetic recording media industries. For example, in magnetic recording media applications, a magnetic disc comprising a non-magnetic substrate such as aluminum (Al) or an aluminum alloy may be coated with an amorphous nickel deposit.

Magnetic disk drives are normally operated using a contact start-stop (CSS) method. In the CSS method, a head begins to slide against the surface of the magnetic disk as the disk begins to rotate and, upon reaching a predetermined rotational speed, the head floats in air a fixed distance above the surface of the disk. The distance that the head floats above the surface of the disk is called the flying height. The head floats above the surface of the disk due to dynamic pressure effects caused by the air flow generated between the recording operations of a disk drive, the head is maintained at a controlled distance from the surface of the magnetic disk, supported on a bearing of air as the disk rotates. Upon terminating operation of the disk drive, the rotational speed of the magnetic disk is decreased such that the head begins to slide against the surface of the disk, until it eventually stops, in contact with and pressing against the disk. Thus, each time the head and disk assembly is driven, the sliding surface of the head repeats this cyclic operation consisting of stopping, sliding against the surface of the disk, floating in air, sliding against the surface of the disk and stopping.

In order to achieve high areal density for magnetic disk drives, it is considered necessary to minimize the flying height of the head above the surface of the magnetic disk. One technique for minimizing the flying height of the head above the surface of the magnetic disk uses substrates having an extremely smooth, defect-free surface for fabricating such magnetic disks. The absence of defects such as, for example, pits is especially important, since pits may adversely affect the writing of information to the magnetic disks.

For manufacturing magnetic recording media, amorphous nickel plating is conventionally applied to a non-magnetic substrate, such as, for example, aluminum (Al) or an Al-alloy substrate. Electroless plated NiP is typically chosen because it exhibits desirable physical and chemical properties, such as hardness, lubricity, appearance, and corrosion resistance.

It is recognized, however, that electroless metal plating, such as electroless NiP plating known to the art, does not achieve coatings exhibiting a desired degree of surface smoothness, particularly the degree of smoothness necessary to satisfy the high areal recording density objectives of current magnetic recording media (e. g., an average surface roughness (Ra) less than about 30 Å). Market competitiveness further requires achievement of ultra-smooth electroless nickel coatings on non-magnetic substrates with increased manufacturing throughput and higher yield.

Conventional techniques for improving the surface smoothness of plated nickel coatings include the incorporation of a polishing step subsequent to the electroless metal plating. Polishing, however, requires a considerable capital investment and results in reduced process throughput.

Accordingly, there exists a need for as-deposited ultra-smooth nickel coatings having reduced defects that do not require subsequent polishing. There exists a particular need for methodology enabling the deposition of amorphous nickel coatings on non-magnetic substrates, which have an as-deposited surface roughness (Ra) less than about 30 Å.

SUMMARY OF THE INVENTION

An information storage system employing a magnetic recording media is provided. The magnetic recording media comprises a non-magnetic substrate having a composite nickel coating thereon is provided. The composite nickel coating includes an electrolessly deposited nickel layer formed on a sputter deposited nickel layer. The as-deposited composite nickel coating has a surface roughness (Ra) less than about 10 Å.

A method of manufacturing a magnetic recording media for use in an information storage system is also provided. The method includes forming a composite nickel coating on a non-magnetic substrate wherein the composite nickel coating comprises an electrolessly deposited nickel layer formed on a sputter deposited nickel layer. The as-deposited composite nickel coating has a surface roughness (Ra) less than about 10 Å.

BRIEF DESCRIPTION OF THE DRAWINGS

Additional objects and features of the present invention will become apparent upon reading of the detailed description of the invention and the appended claims provided below, and upon reference to the drawings in which:

DETAILED DESCRIPTION

The present invention advantageously achieves formation of composite nickel coatings on non-magnetic substrates having a surface roughness (Ra) less than about 10 Å. The achievement of such ultra-smooth as-deposited composite nickel coatings yields several technological advantages. For example, after the composite nickel coating is formed on the non-magnetic substrate, the high degree of surface smoothness eliminates the need for a subsequent polishing step. As such, the composite coated substrate may be used directly for a media deposition process, improving the overall process throughput for the manufacture of magnetic recording media. The composite nickel coatings having an as-deposited ultra-smooth surface enables and facilitates the manufacture of magnetic recording medium having high areal recording density, with reduced flying heights for the head.

Figure 1:
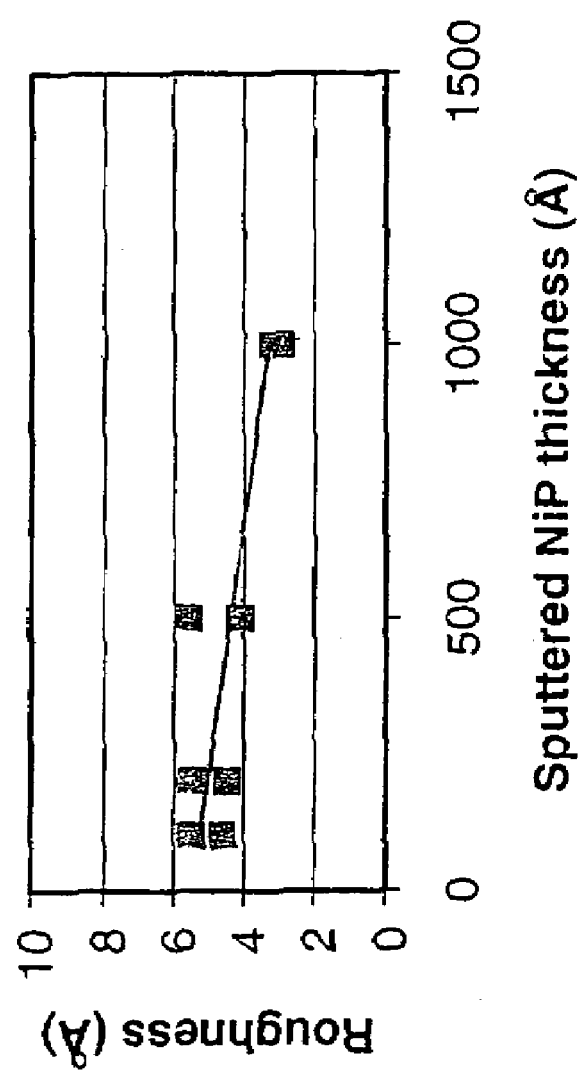
FIG. 1 depicts a graph of the surface roughness for a composite nickel coating of the present invention plotted as a function of the thickness of an underlying sputtered NiP layer.

The present invention stems from the discovery that the deposition of a sputtered nickel layer on a substrate prior to the deposition of an electrolessly plated nickel layer thereover provides a composite nickel coating having a surface roughness that is significantly smoother than that of traditionally deposited electroless nickel layers. Furthermore, as illustrated in FIG. 1, the degree of surface smoothness appears to be enhanced as the thickness of the underlying sputtered nickel layer is increased.

Figure 2:
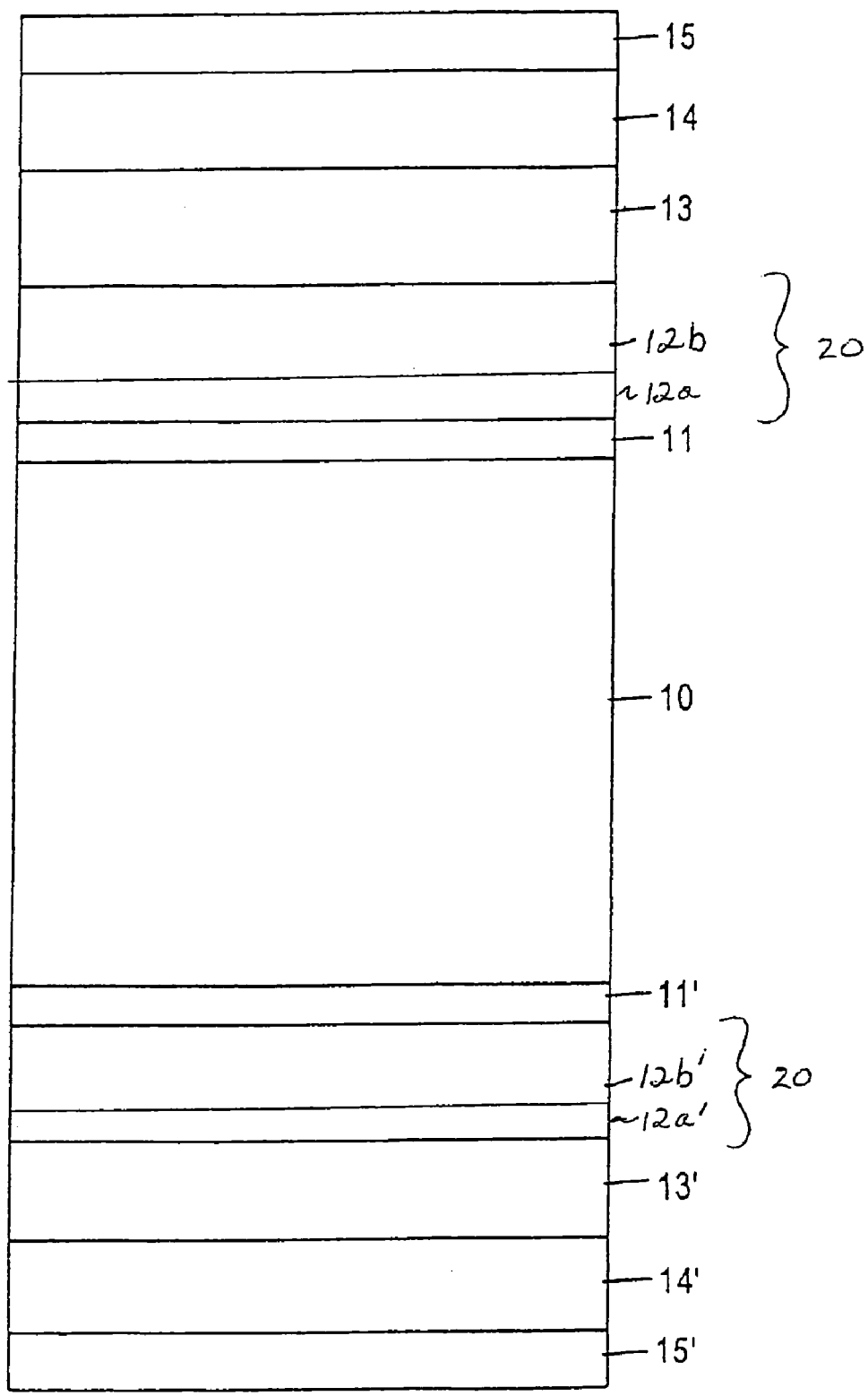
FIG. 2 schematically illustrates a magnetic recording medium to which the present invention is applicable.

The composite nickel coatings of the present invention are applicable to the manufacture of magnetic recording medium, as depicted in FIG. 2. The magnetic recording medium comprises a substrate 10, typically formed of glass or glass-ceramic materials. Alternative substrates may include metal matrix composites, reacted metal-ceramics, aluminum alloys such as, for example, aluminum-magnesium (AlMg), as well as graphite and metal matrix composites, such as $B_4C$—Al.

The substrate 10 may be ground, lapped or polished in order to reduce the surface roughness thereof before the composite nickel coating is applied thereto. Also, the substrate should preferably have a macro-waviness (undulations across the surface thereof) that is less than about 1000 Å.

The magnetic recording medium is typically deposited on both sides of the substrate 10. Typically, an adhesion enhancement layer 11, 11' is deposited on the substrate 10 to improve the adhesion of subsequently deposited layers thereon. Suitable materials for the adhesion enhancement layer include chromium and chromium alloys, as well as titanium tungsten (TiW).

The composite nickel coating 20 comprising a sputter deposited nickel layer 12a, 12a' and an electrolessly deposited nickel layer 12b, 12b' is formed on the substrate 10. The sputter deposited nickel layer 12a, 12a' is formed on adhesion enhancement layer 11, 11'. The sputter deposited nickel layer 12a, 12a' may comprise NiP formed from a NiP target comprising about 15 atomic % to about 30 atomic % nickel (Ni). The sputter deposited nickel layer 12a, 12a' preferably has a thickness within a range of about 10 Å to about 1000 Å.

After the sputter deposited nickel layer 12a, 12a' is deposited, the electrolessly deposited nickel layer 12b, 12b' is formed thereon. The electroless nickel plating bath employed in the present invention may be a conventional electroless composition such as is disclosed in U.S. Pat. No. 4,567,066, and those disclosed in Hajdu, J. B. et al., "THE ELECTROLESS NICKEL PROCESS FOR MEMORY DISKS," The Electrochemical Society Magnetic Materials, Processes, and Devices, Electro-Deposition Proceedings, Vol. 92–10, pp. 39–55 (1992), and which are incorporated by reference.

Electroless nickel plating compositions generally comprise four ingredients dissolved in a solvent, typically water. These ingredients include: (1) a source of Ni ions; (2) a reducing agent, such as a hypophosphite or an amine borane; (3) an acid or hydroxide pH adjuster to provide a suitable pH; and (4) a complexing agent for metal ions sufficient to prevent their precipitation in solution. When a hypophosphite is used for the reducing agent, the deposit will contain Ni and P. On the other hand, if an amine borane is used for the reducing agent, the deposit will contain Ni and boron (B).

Ni ions can be provided by employing a suitable soluble salt, such as nickel sulfate, nickel chloride, nickel acetate and mixtures thereof. The concentration of Ni in solution can vary widely. Ni concentrations are typically within a range of about 0.1 g/l to about 100 g/l.

The reducing agent employed, particularly in manufacturing a magnetic recording medium, is typically a hypophosphite ion supplied to the bath by any suitable source, such as sodium hypophosphite, potassium hypophosphite, ammonium hypophosphite, and nickel hypophosphite. Other reducing agents, such as amine boranes, borohydrides and hydrazine, can also suitably be employed. The concentration of the reducing agent is generally in excess of the amount sufficient to reduce the Ni in the bath.

The plating bath can be acid, neutral or alkaline, and the acid or alkaline pH adjuster can be selected from a wide range of materials, such as ammonium hydroxide, sodium hydroxide, and hydrochloric acid. The pH of the bath may range from about 2 to about 12.

The complexing agent can be selected from a wide variety of materials, such as lactic acid, malic acid, and those containing anions such as acetate, citrate, glycolate, pyrophosphate, and mixtures thereof. Ranges for the complexing agent, based on the anion, can vary widely with a range of about 1 g/l to about 300 g/l.

The electroless Ni plating baths employed in the present invention can also contain other conventional additives, such as buffering agents, bath stabilizers, rate promoters, brighteners, etc. Stabilizers such as lead, antimony, mercury, tin and oxy compounds, such as iodate, can also be employed. Suitable electroless plating baths can be formed by dissolving the ingredients in water and adjusting the pH within the desired range.

The incorporation of certain metal ions in a plating bath for electroless Ni deposition additionally enhances the smoothness of the as-deposited surface, as disclosed in U.S. Pat. No. 6,106,927. Suitable metal ions may include Al and/or Cu ions. The metal ions can be incorporated in the electroless Ni plating bath in any of various forms, such as a salt. For example, Al ions may be provided to the plating bath from aluminum sulfate, e.g., $Al_2(SO_4)_3$ $16H_2O$, and Cu ions from copper sulfate ($CuSO_4$). The concentration of Al ions in the plating bath is preferably less than about 20 parts per million (ppm), while the concentration of Cu ions in the plating bath is preferably within a range of about 5 ppm to about 10 ppm.

In accordance with embodiments of the present invention, the electrolessly deposited nickel coatings 12b, 12b' may have a thickness within the range of about 0.5 microns to about 10 microns, deposited at a temperature within a range of about 25° C. to about 100° C.

The degree of surface smoothness achieved for the composite nickel coating of the present invention may be appreciated with reference to the following examples.

EXAMPLE 1

A nickel phosphorus (NiP) composite coating was prepared. The NiP composite coating was prepared by sputtering a nickel-phosphorus (NiP) layer on a TiW coated Ohara TS-10 SXSP glass-ceramic disk. The NiP was sputtered from a NiP target comprising about 25 atomic % nickel. The sputter deposited NiP layer had a thickness of about 1000 Å. A 1 micron thick nickel phosphorus (NiP) layer was electrolessly deposited over the sputter deposited NiP layer. The NiP layer was electrolessly plated from an Enthone 6450 Ni plating bath.

The surface roughness of the as-deposited composite nickel layer was measured using AFM (Atomic Field Microscopy). A 10 micron×10 micron scan of the composite nickel coating indicated a surface roughness (Ra) of about 3.2 Å.

EXAMPLE 2

A nickel phosphorus (NiP) composite coating was prepared. The NiP composite coating was prepared by sputtering a nickel-phosphorus (NiP) layer on a TiW coated Ohara TS-10 SXSP glass-ceramic disk. The NiP was sputtered from a NiP target comprising about 25 atomic % nickel. The sputter deposited NiP layer had a thickness of about 500 Å. A 1 micron thick nickel phosphorus (NiP) layer was electrolessly deposited over the sputter deposited NiP layer. The NiP layer was electrolessly plated from an Enthone 6450 Ni plating bath.

The surface roughness of the as-deposited composite nickel layer was measured using AFM (Atomic Field Microscopy). A 10 micron×10 micron scan of the composite nickel coating indicated a surface roughness (Ra) of about 5.6 Å.

EXAMPLE 3

A nickel phosphorus (NiP) composite coating was prepared. The NiP composite coating was prepared by sputtering a nickel-phosphorus (NiP) layer on a TiW coated Ohara TS-10 SXSP glass-ceramic disk. The NiP was sputtered from a NiP target comprising about 25 atomic % nickel. The sputter deposited NiP layer had a thickness of about 200 Å. A 1 micron thick nickel phosphorus (NiP) layer was electrolessly deposited over the sputter deposited NiP layer. The NiP layer was electrolessly plated from an Enthone 6450 Ni plating bath.

The surface roughness of the as-deposited composite nickel layer was measured using AFM (Atomic Field Microscopy). A 10 micron×10 micron scan of the composite nickel coating indicated a surface roughness (Ra) of about 5.5 Å.

EXAMPLE 4

A nickel phosphorus (NiP) composite coating was prepared. The NiP composite coating was prepared by sputtering a nickel-phosphorus (NiP) layer on a TiW coated Ohara TS-10 SXSP glass-ceramic disk. The NiP was sputtered from a NiP target comprising about 25 atomic % nickel. The sputter deposited NiP layer had a thickness of about 100 Å. A 1 micron thick nickel phosphorus (NiP) layer was electrolessly deposited over the sputter deposited NiP layer. The NiP layer was electrolessly plated from an Enthone 6450 Ni plating bath.

The surface roughness of the as-deposited composite nickel layer was measured using AFM (Atomic Field Microscopy). A 10 micron×10 micron scan of the composite nickel coating indicated a surface roughness (Ra) of about 5.5 Å.

Referring again to FIG. 2, after the composite nickel coating 20 is formed on the substrate 10 the magnetic medium is deposited thereon. The magnetic medium typically includes an underlayer 13, 13', such as chromium or a chromium alloy, a magnetic layer 14, 14', such as a cobalt-based alloy, and a protective overcoat 15, 15' such as a carbon-containing material. Typically, although not shown for illustrative convenience, a lubricant topcoat is applied on the protective overcoat 15, 15'. It should be understood that the present invention is applicable to the production of various types of magnetic recording media, and is not limited to any particular substrate material, underlayer, magnetic layer, protective overcoat or lubricant topcoat.

The magnetic recording media of the present invention may be used in an information storage system. The information storage system will comprise at least a head-disk assembly and control electronics which may be employed with a computer, printer, or fax machine or other host system. Many different information storage system configurations are known in the art, including those described in U.S. Pat. Nos. 5,097,368; 5,193,046; and 5,317,463.

Figure 3:
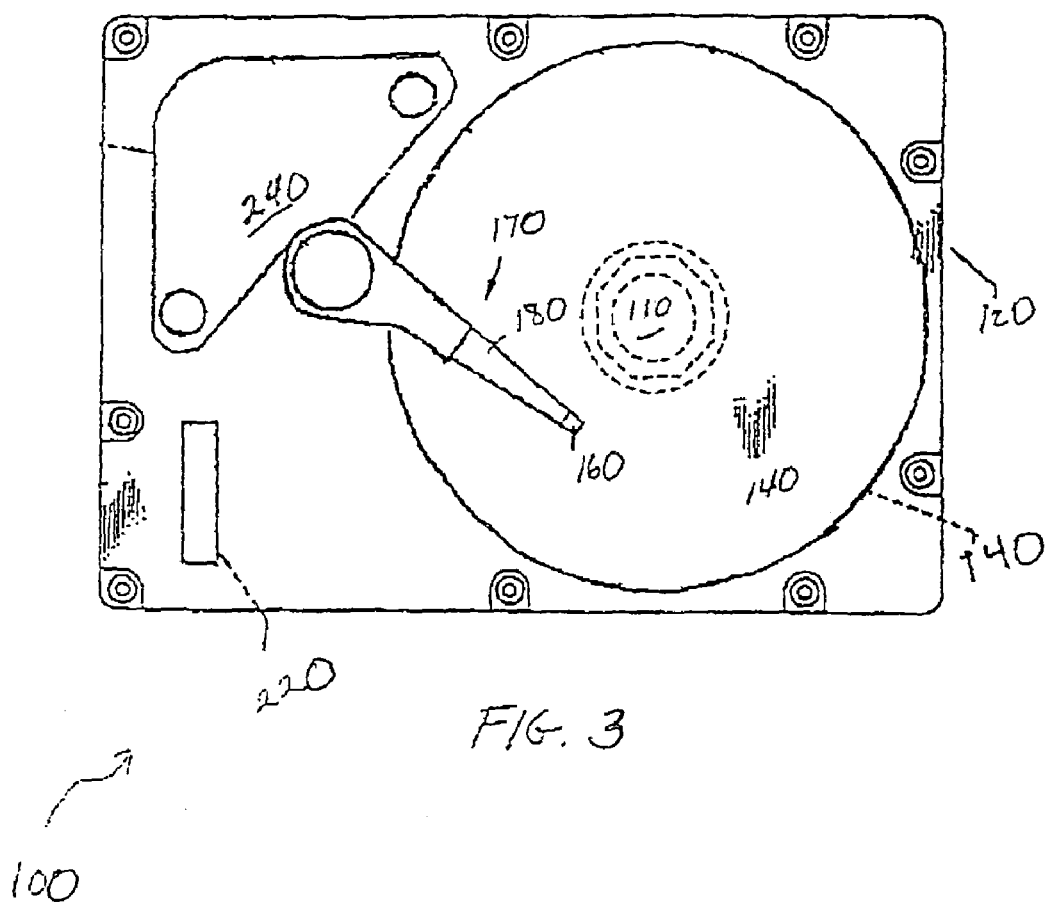
FIG. 3 shows a magnetic recording medium in an information storage system in accordance with the present invention.

A simplified drawing of an exemplary information storage system is shown in FIG. 3. As shown in FIG. 3, the information storage system 100 includes a sealed housing 120, a rigid magnetic recording media 140 which is usually in the form of a disk, a read/write head 160, and an actuator assembly 170. The actuator assembly 170 includes an actuator arm 180 for positioning the read/write head 160 disposed at the end of the actuator arm 180 over the surface of the recording medium 140. Multiple read/write heads 160 may be employed although not shown in the plan view. The read/write head 160 carries the magnetic recording media of the present invention. A spindle motor 110 is provided which mounts the disk or disks 140 and spins them at a constant speed. A header assembly 220 is provided for transferring electronic signals to and from a motor 240 which positions the actuator and the read/write head 160 as data transferred to and from the disk 140.

Only certain embodiments of the present invention and but a few examples of its versatility are shown and described in the present disclosure. It is to be understood that the present invention is capable of use in various other combinations and environments, and is capable of changes and modifications within the scope of the inventive concept as expressed herein.

What is claimed is:

1. A magnetic recording medium comprising, in this order:

(a) a non-magnetic substrate, (b) a composite nickel-containing coating comprising a sputter deposited nickel-containing layer comprising NiP and an electrolessly deposited nickel-containing layer thereon, the composite nickel-containing coating having a bottom surface contacting the non-magnetic substrate and a top surface, and (c) a magnetic recording layer on the top surface of the composite nickel-containing coating, wherein the top surface of the composite nickel-containing coating is a non-polished surface and has a surface roughness (Ra) of less than about 10 Å, wherein the surface roughness (Ra) is averaged over the entire surface of the top surface of the composite nickel-containing coating.

2. A magnetic recording medium of claim 1, wherein the top surface of the composite nickel-containing coating directly contacts the magnetic layer.

3. A magnetic recording medium of claim 1, wherein the non-magnetic substrate comprises glass or a glass-ceramic material.

4. A magnetic recording medium of claim 1, the electrolessly deposited nickel-containing layer comprises NiP.

5. A magnetic recording medium of claim 1, the sputter deposited nickel-containing layer comprising about 15 atomic percent to about 30 atomic percent Ni.

6. A magnetic recording medium of claim 1, wherein the sputter deposited layer has a thickness in a range of about 10 Å to about 1000 Å.

7. A magnetic recording medium of claim 1, wherein the electrolessly deposited nickel-containing layer has a thickness in a range of about 0.5 microns to about 1 micron.

* * * * *